United States Patent
Sun et al.

(10) Patent No.: US 11,825,450 B2
(45) Date of Patent: Nov. 21, 2023

(54) CHANNEL RESERVATION FOR SIDELINK

(71) Applicant: QUALCOMM Incorporated, San Diego, CA (US)

(72) Inventors: Jing Sun, San Diego, CA (US); Xiaojie Wang, Hillsborough, NJ (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 17/370,283

(22) Filed: Jul. 8, 2021

(65) Prior Publication Data

US 2022/0078754 A1 Mar. 10, 2022

Related U.S. Application Data

(60) Provisional application No. 63/074,882, filed on Sep. 4, 2020.

(51) Int. Cl.
| | | |
|---|---|---|
| *H04W 72/02* | (2009.01) | |
| *H04W 4/40* | (2018.01) | |
| *H04W 28/26* | (2009.01) | |
| *H04W 72/0453* | (2023.01) | |
| *H04W 72/0446* | (2023.01) | |
| *H04W 4/46* | (2018.01) | |
| *H04L 5/00* | (2006.01) | |

(52) U.S. Cl.
CPC .............. *H04W 72/02* (2013.01); *H04W 4/40* (2018.02); *H04W 4/46* (2018.02); *H04W 28/26* (2013.01); *H04W 72/0446* (2013.01); *H04W 72/0453* (2013.01); *H04L 5/0042* (2013.01); *H04L 5/0044* (2013.01)

(58) Field of Classification Search
CPC . H04W 72/02; H04W 28/26; H04W 72/0446; H04W 72/0453; H04W 76/14; H04L 5/0042; H04L 5/0039
See application file for complete search history.

(56) References Cited

U.S. PATENT DOCUMENTS

| | | | |
|---|---|---|---|
| 2018/0115906 A1 | 4/2018 | Damnjanovic et al. | |
| 2021/0105789 A1* | 4/2021 | Freda | H04W 72/543 |
| 2022/0159674 A1* | 5/2022 | Deng | H04W 72/566 |

FOREIGN PATENT DOCUMENTS

WO 2020172576 A1 8/2020

OTHER PUBLICATIONS

International Search Report and Written Opinion—PCT/US2021/041025—ISA/EPO—dated Nov. 17, 2021.

\* cited by examiner

*Primary Examiner* — Jae Y Lee
*Assistant Examiner* — Aixa A Guadalupe Cruz
(74) *Attorney, Agent, or Firm* — Patterson + Sheridan, LLP

(57) ABSTRACT

Certain aspects of the present disclosure provide techniques for channel reservation for sidelink. In some embodiments, the disclosure describes determining a resource allocation for communicating over a plurality of subchannels within a slot, wherein the resource allocation provides: (i) a first set of subchannels of the plurality of subchannels allocated for communicating data to multiple UEs, and (ii) a first subchannel of the plurality of subchannels allocated for communicating a group reservation signal comprising communication parameters indicative of at least the resource allocation for the first set of subchannels.

20 Claims, 11 Drawing Sheets

CHANNEL RESERVATION FOR SIDELINK

CROSS REFERENCE TO RELATED APPLICATION

This application hereby claims priority under 35 U.S.C. § 119 to U.S. Provisional Patent Application No. 63/074,882, filed on Sep. 4, 2020, the contents of which are incorporated herein in their entirety.

BACKGROUND

Field of the Disclosure

Aspects of the present disclosure relate to wireless communications, and more particularly, to techniques for channel reservation for sidelink communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A base station (BS) or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user-equipment (UE). The method generally includes determining a resource allocation for communicating over a plurality of subchannels within a slot, wherein the resource allocation provides a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels, and transmitting the group reservation signal over the first subchannel, and data to each of the multiple UEs over corresponding subchannels of the first set of subchannels.

Certain aspects provide a user-equipment (UE). The UE generally includes means for determining a resource allocation for communicating over a plurality of subchannels within a slot, wherein the resource allocation provides a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels, and means for transmitting the group reservation signal over the first subchannel, and data to each of the multiple UEs over corresponding subchannels of the first set of subchannels.

Certain aspects provide a user-equipment (UE). The UE generally includes a processing system configured to determine a resource allocation for communicating over a plurality of subchannels within a slot, wherein the resource allocation provides a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels, and a transmitter configured to transmit the group reservation signal over the first subchannel, and data to each of the multiple UEs over corresponding subchannels of the first set of subchannels.

Certain aspects provide an apparatus for wireless communications by a user-equipment (UE). The apparatus generally includes a processing system configured to determine a resource allocation for communicating over a plurality of subchannels within a slot, wherein the resource allocation provides a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels and an interface configured to output, for transmission the group reservation signal over the first subchannel, and data to each of the multiple UEs over corresponding subchannels of the first set of subchannels.

Certain aspects provide a computer-readable medium for wireless communications. The computer-readable medium generally includes codes executable to determine a resource allocation for communicating over a plurality of subchannels within a slot, wherein the resource allocation provides a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels, and output, for transmission the group reservation signal over the first subchannel, and data to each of the multiple UEs over corresponding subchannels of the first set of subchannels.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
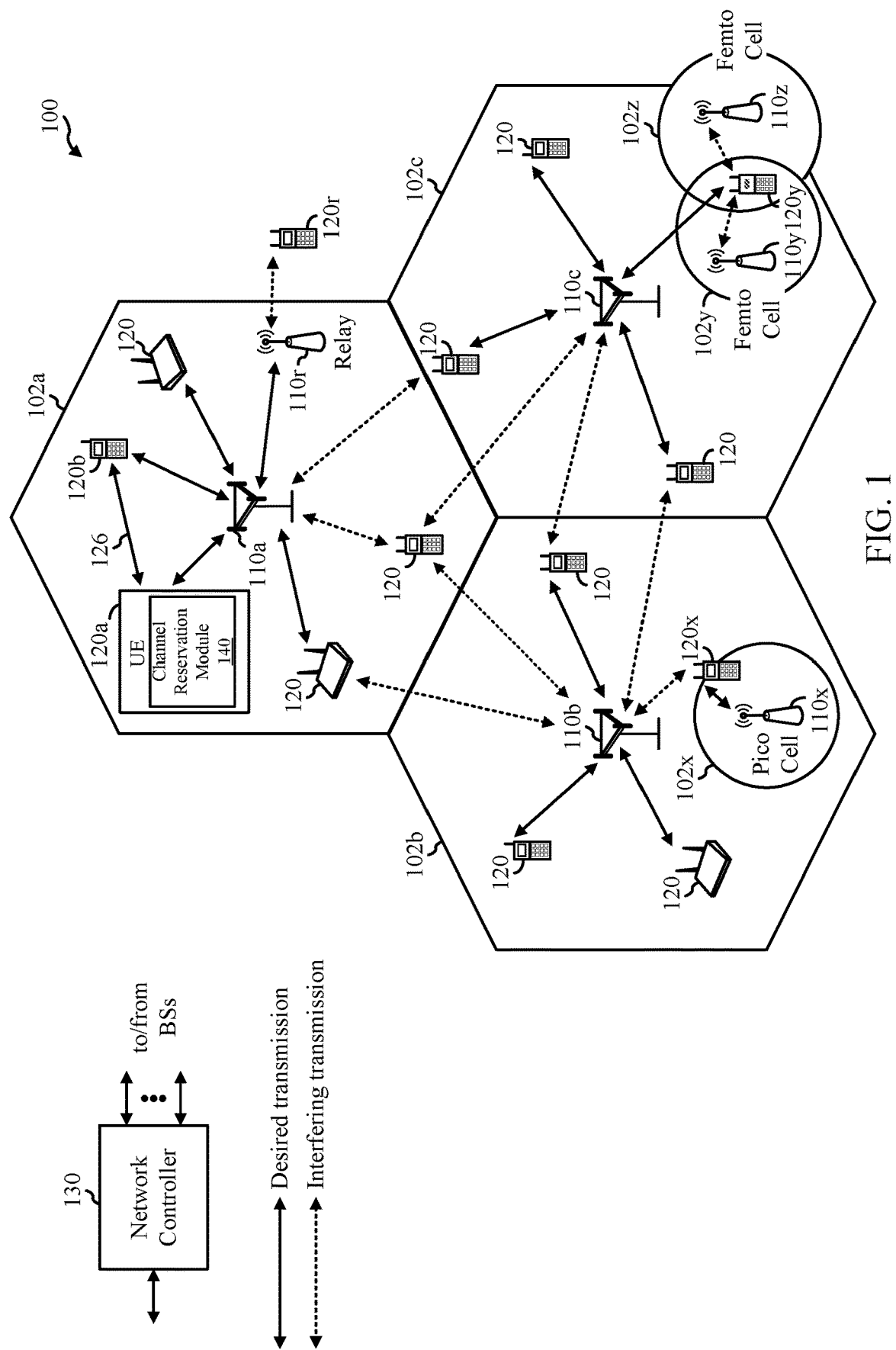
FIG. 1 is a block diagram conceptually illustrating an example telecommunications system, in accordance with certain aspects of the present disclosure.

Aspects of the present disclosure provide apparatus, methods, processing systems, and computer readable mediums for resource reservation to support legacy user equipment (UEs) in wireless environments that do not provide for resource reservation via control signaling. As described in more detail below, control signaling (e.g., physical sidelink control channel (PSCCH)) may no longer be used for certain communications. Instead, other methods of reserving resources have been proposed. Accordingly, if these changes are implemented, a backward compatibility problem may arise where legacy UEs monitoring a subchannel will not see any PSCCH (as it is not transmitted) indicating the resources over which the legacy UE is to receive data. As such, the legacy UE will be unable to consider the information in the resource reservation. Thus, there is a need for a backward compatible mechanism to provide resource allocation (e.g., resource reservation and scheduling information) to a legacy UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5GNR network). For example, the UE 120a includes a channel reservation module 140. In some examples, the channel reservation module 140 may support the operations illustrated in FIG. 10. For example, the channel reservation module 140 may determine a resource allocation for communicating over a plurality of subchannels within a slot, wherein the resource allocation provides: (i) a first set of subchannels of the plurality of subchannels allocated for communicating data to multiple UEs, and (ii) a first subchannel of the plurality of subchannels allocated for communicating a group reservation signal comprising communication parameters indicative of at least the resource allocation for the first set of subchannels. The channel reservation module 140 may also support transmitting: (i) the group reservation signal over the first subchannel, and (ii) data to each of the multiple UEs over corresponding subchannels of the first set of subchannels.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a UE or BS may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. As used herein, "resource allocation," "resource reservation," and the like may refer to a frequency-time unit that can be allocated to a UE (e.g., an RB, a subframe, a frame, a subchannel, a channel, or a portion thereof) for communication (e.g., transmission and/or reception) of wireless communication signaling.

The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, vehicle to everything (V2X) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or base station), even though the scheduling entity may be utilized for scheduling and/or control purposes. In some examples, the sidelink signals may be communicated using a licensed spectrum (unlike wireless local area networks, which typically use an unlicensed spectrum).

In some examples of the wireless communication network 100, sidelink communication may be established between UEs without necessarily relying on UE ID or control information from a base station. For example, UE 120*a* may initiate a sidelink communication with UE 120*b* without relying on a direct connection with a base station (e.g., base station 110*a*) if either UE is outside of cell 102*a* range. Any of the UEs may function as a scheduling entity or a primary sidelink device, while the other UE may function as a subordinate entity or a non-primary (e.g., secondary) sidelink device. Further, the UEs may be configured to perform beam management procedures for a sidelink as described throughout the disclosure. Accordingly, one or more of the UEs may function as a scheduling entity in a device-to-device (D2D), peer-to-peer (P2P), or vehicle-to-vehicle (V2V) network, and/or in a mesh network to initiate and/or schedule certain beam management procedures.

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
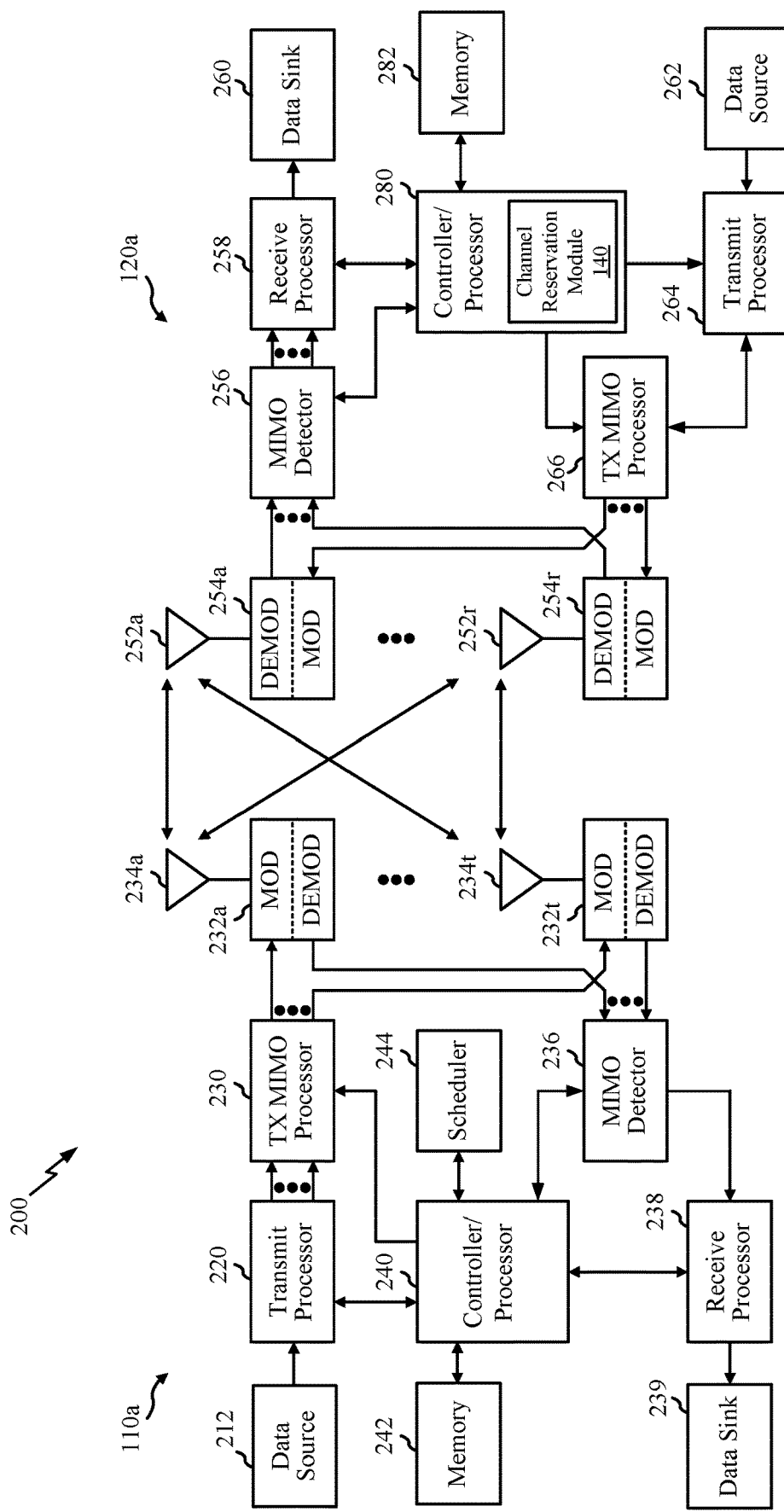
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, the controller/processor 280 of the UE 120*a* includes a channel reservation module 140. In some examples, the channel reservation module 140 may support the operations illustrated in FIG. 10. For example, the channel reservation module 140 may determine a resource allocation for communicating over a plurality of subchannels within a slot, wherein the resource allocation provides: (i) a first set of subchannels of the plurality of subchannels allocated for communicating data to multiple UEs, and (ii) a first subchannel of the plurality of subchannels allocated for communicating a group reservation signal comprising communication parameters indicative of at least the resource allocation for the first set of subchannels. The channel reservation module 140 may also support transmitting: (i) the group reservation signal over the first subchannel, and (ii) data to each of the multiple UEs over corresponding subchannels of the first set of subchannels.

At the BS 110, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120, the antennas 252*a*-252*r* may receive the downlink signals from the BS 110 and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
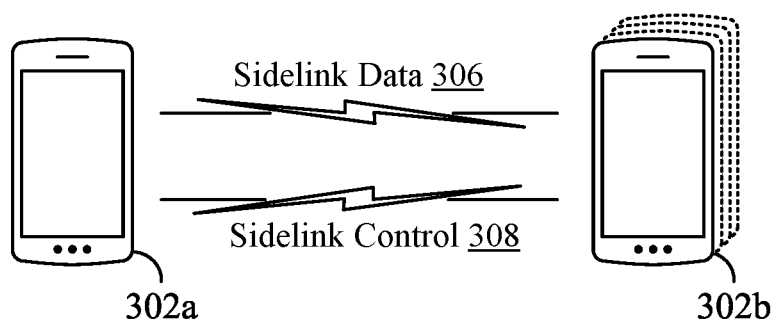
FIG. 3 is a diagram conceptually illustrating a sidelink communication between a first user equipment (UE) and one or more second UEs.

FIG. 3 is a diagram conceptually illustrating a sidelink communication between a first UE 302*a* and one or more second UEs 302*b* (collectively, "second UE 302*b*"). In various examples, any one of the first UE 302*a* and the second UE 302*b* may correspond to a UE or other suitable node in the wireless communication network 100. For example, any one of the first UE 302*a* and the second UE 302*b* may correspond to UE 120, or UE 124*a*-124*d*.

In some examples, the first UE 302*a* and the second UE 302*b* may utilize sidelink signals for direct D2D communication. The D2D communication may use the downlink/ uplink WWAN spectrum. The D2D communication may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Flash-LinQ, WiMedia, Bluetooth, ZigBee, Wi-Fi based on the IEEE 802.11 standard, LTE, or NR.

Sidelink signals may include sidelink data 306 (i.e., sidelink traffic) and sidelink control information 308. Broadly, the first UE 302a and one or more a second UEs 302b may communicate sidelink data 306 and sidelink control information 308 using one or more data channels and control channels. In some aspects, data channels include a physical sidelink shared channel (PSSCH) and/or sidelink shared channel (SL-SCH). In some aspects, control channels include a physical sidelink control channel (PSCCH) and/or physical sidelink feedback channel (PSFCH).

Sidelink control information 308 may include a source transmit signal (STS), a direction selection signal (DSS), and a destination receive signal (DRS). The DSS/STS may provide for a UE 302 (e.g., 302a, 302b) to request a duration of time to keep a sidelink channel available for a sidelink signal; and the DRS may provide for the UE 302 to indicate the availability of the sidelink channel, e.g., for a requested duration of time. Accordingly, the first UE 302a and the second UE 302b may negotiate the availability and use of sidelink channel resources prior to communication of sidelink data 306 information.

In some configurations, any one or more of the first UE 302a or the second UE 302b may be responsible for initiating and/or scheduling traffic in a D2D communication, including the communication of sidelink data 306 and sidelink control information 308, and maintenance of the sidelink communication channel(s). For example, the first UE 302a may be responsible for scheduling and/or initiating beam management procedures (e.g., initial beam selection procedures, beam sweeping procedures, beam refinement procedures, etc.) between the first UE 302a and the second UE 302b, as disclosed herein. In this example, the second UE 302b receives scheduling control information, including but not limited to beam management scheduling information, synchronization or timing information, or other control information.

The channels or carriers illustrated in FIG. 3 are not necessarily all of the channels or carriers that may be utilized between a first UE 302a and a second UE 302b in a sidelink communication, and those of ordinary skill in the art will recognize that other channels or carriers may be utilized in addition to those illustrated, such as other data, control, and feedback channels.

Figure 4:
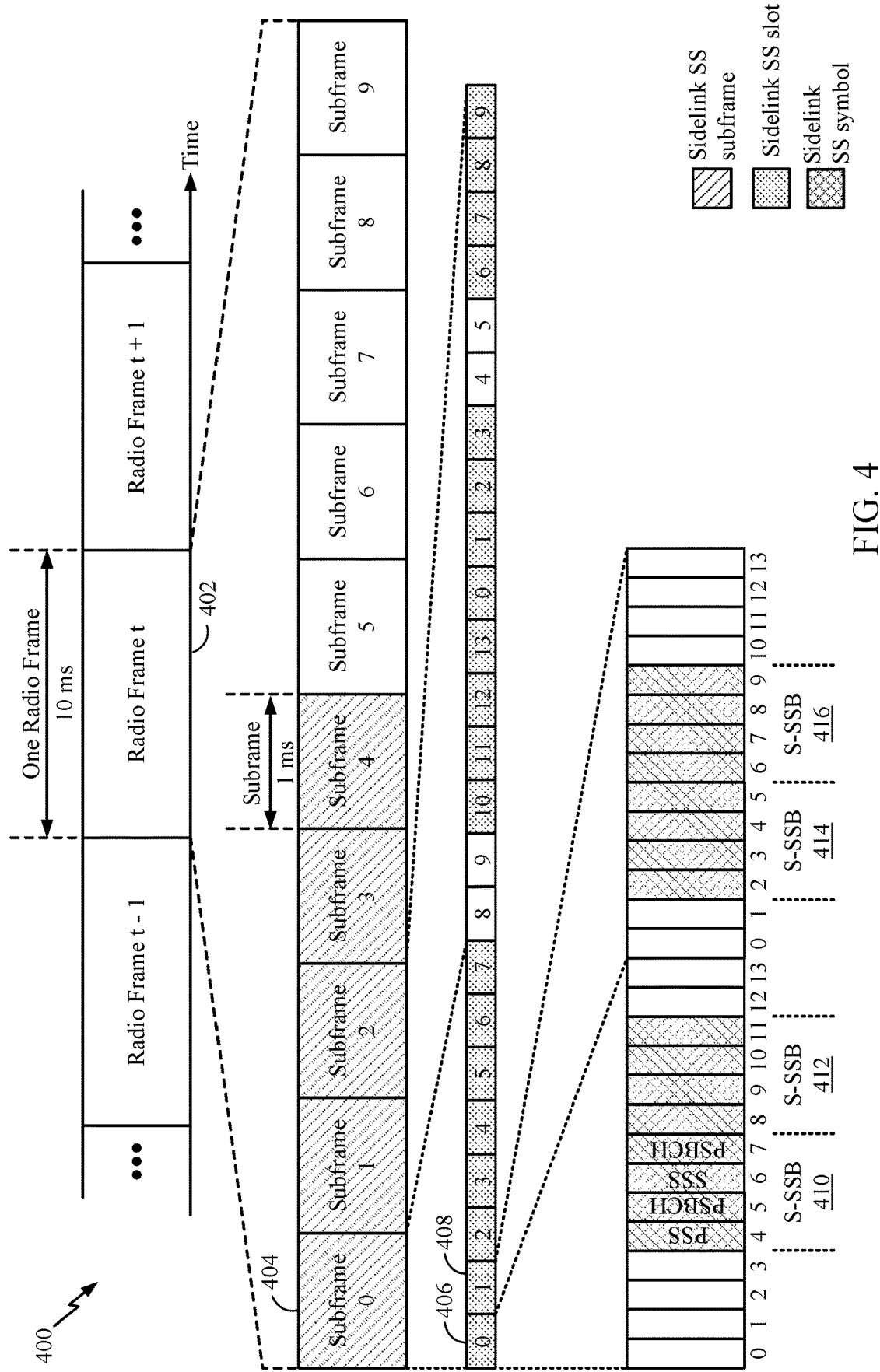
FIG. 4 is a diagram showing an example of a frame format.

FIG. 4 is a diagram showing an example of a frame format 400. The transmission timeline for each data transmission and reception may be partitioned into units of radio frames 402. In NR, the basic transmission time interval (TTI) may be referred to as a slot. In NR, a subframe may contain a variable number of slots (e.g., 1, 2, 4, 8, 16, . . . , N slots) depending on the subcarrier spacing (SCS). NR may support a base SCS of 15 KHz and other SCS may be defined with respect to the base SCS (e.g., 30 kHz, 60 kHz, 120 kHz, 240 kHz, etc.). In the example shown in FIG. 4, the SCS is 120 kHz. As shown in FIG. 4, the subframe 404 (subframe 0) contains 8 slots (slots 0, 1, . . . , 7 with a 0.125 ms duration. The symbol and slot lengths scale with the subcarrier spacing. Each slot may include a variable number of symbol (e.g., OFDM symbols) periods (e.g., 7 or 14 symbols) depending on the SCS. For the 120 kHz SCS shown in FIG. 4, each of the slot 406 (slot 0) and slot 408 (slot 1) includes 14 symbol periods (slots with indices 0, 1, . . . , 13) with a 0.25 ms duration.

In sidelink, a sidelink synchronization signal block (S-SSB), referred to as the SS block or SSB, is transmitted. The SSB may include a primary SS (PSS), a secondary SS (SSS), and/or a two symbol physical sidelink broadcast channel (PSBCH). In some examples, the SSB can be transmitted up to sixty-four times with up to sixty-four different beam directions. The up to sixty-four transmissions of the SSB are referred to as the SS burst set. SSBs in an SS burst set may be transmitted in the same frequency region, while SSBs in different SS bursts sets can be transmitted in different frequency regions.

In the example shown in FIG. 4, in the subframe 404, SSB is transmitted in each of the slots (slots 0, 1, . . . , 7. In the example shown in FIG. 4, in the slot 406 (slot 0), an SSB 410 is transmitted in the symbols 4, 5, 6, 7 and an SSB 412 is transmitted in the symbols 8, 9, 10, 11, and in the slot 408 (slot 1), an SSB 414 is transmitted in the symbols 2, 3, 4, 5 and an SSB 416 is transmitted in the symbols 6, 7, 8, 9, and so on. The SSB may include a primary SS (PSS), a secondary (SSS), and a two symbol physical sidelink broadcast channel (PSBCH). The PSS and SSS may be used by UEs to establish sidelink communication (e.g., transmission and/or reception of data and/or control channels). The PSS may provide half-frame timing, the SS may provide cyclic prefix (CP) length and frame timing. The PBSCH carries some basic system information, such as system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), and other system information (OSI) can be transmitted on a physical sidelink shared channel (PSSCH) in certain subframes.

In NR, the basic subcarrier spacing is fixed in frequency range 1 (FR1) and FR2. For example, synchronization signal blocks (SSBs) can have subcarrier spacing (SCS) of 15 kHz or 30 kHz in FR1, and 120 kHz or 240 kHz in FR2. Thus, in order for a first UE to synchronize with second UE or a BS, that first UE must search one or both SCSs in each frequency range for the synchronization signal of the second UE or the BS. In the case of sidelink, the first UE has the option of requesting the sidelink synchronization signal block (S-SSB) numerology of the second UE from the BS.

Figure 5:
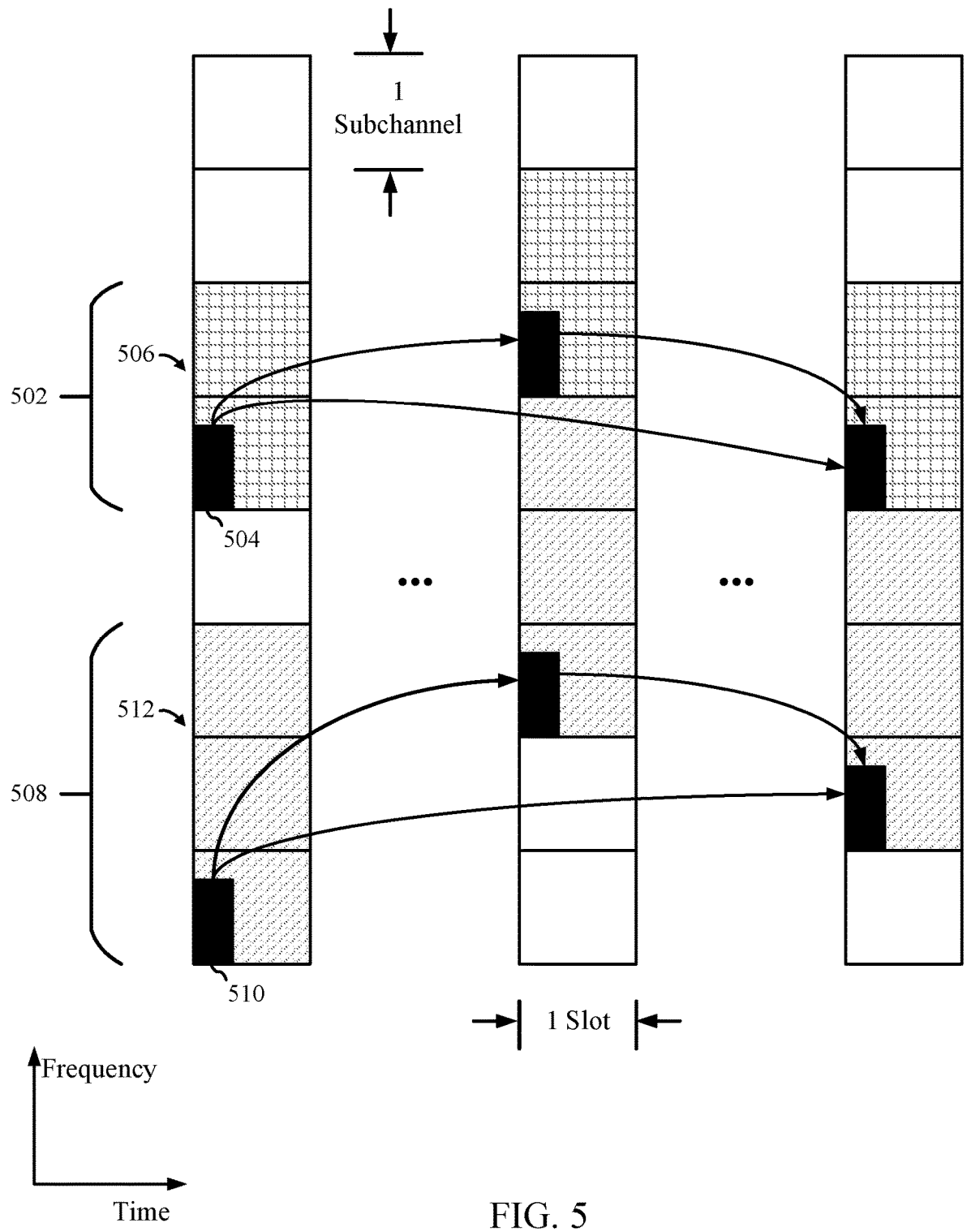
FIG. 5 is a block diagram illustrating a first transmitted communication and a second transmitted communication made by a UE.

FIG. 5 is a block diagram illustrating a first transmitted communication 502 and a second transmitted communication 508 made by a UE (e.g., UE 120a of FIG. 1). It should be noted that although each full square in FIG. 5 is dimensioned as one subchannel during one slot, any other suitable dimensions are contemplated (e.g., one subchannel during a partial slot, one channel during a slot, etc.). The shaded regions of the squares illustrated in FIG. 5 represent either data or control information. Accordingly, squares without shading represent unreserved and/or unused resources.

In some embodiments, one or more of the first transmitted communication 502 and the second transmitted communication 508 may be sidelink communications. The first transmitted communication 502 includes a PSSCH 506 portion and a PSCCH 504 portion (e.g., sidelink control information format 1 (SCI-1)) communicated over two subchannels during a single slot. Similarly, the second transmitted communication 508 includes a PSSCH 512 portion and a PSCCH 510 portion communicated over three subchannels during a single slot.

Each PSCCH portion may be transmitted in the first 2 or 3 symbols of the first subchannel of the corresponding transmitted communication (502, 508), and the PSSCH may be rate matched around the PSCCH portion. In some examples, the PSCCH portions (504, 510) may include resource allocation information for additional slots within up to 31 slots after the current transmission. The PSCCH portions (504, 510) may also include an indication of the periodicity of the transmission. Here, the indication of periodicity may provide a resource reservation for the next instance of transmission for a periodic transmission. Accordingly, another UE may decode the PSCCHs to determine if a future resource is available.

However, in 5G NR, the PSCCH portions may no longer be used for communications. For example, instead of announcing resource allocations via the PSCCH, a base station may schedule sidelink communications between UEs. In this example, a special downlink control information (DCI) message may be transmitted to a transmitting UE and a receiving UE with proper scheduling information such that there is no need for PSCCHs between the UEs. In another example, a PSCCH may no longer be required if a transmitting UE transmits a reverse link (RL) grant to a receiver UE such that the receiver UE will send a PSSCH to the transmitting UE at a later resource. In another example, semi-persistent scheduling (SPS) of traffic between two UEs may be scheduled by RRC messaging. In yet another example, a single sidelink communication may include at least two sidelink component carriers: a first carrier for communicating control information, and a second carrier for communicating data. In such an example, the resource allocation is carried in the first carrier, and is not included in the data carrier.

Accordingly, if these changes are implemented, a backward compatibility problem may arise where legacy UEs monitoring a subchannel will not see any PSCCH (as it is not transmitted). As such, the legacy UE will be unable to consider the information in the resource reservation. Thus, there is a need for a backward compatible mechanism to provide resource allocation (e.g., resource reservation and scheduling information) to a legacy UE.

Example Group Resource Reservation Transmission

Figure 6:
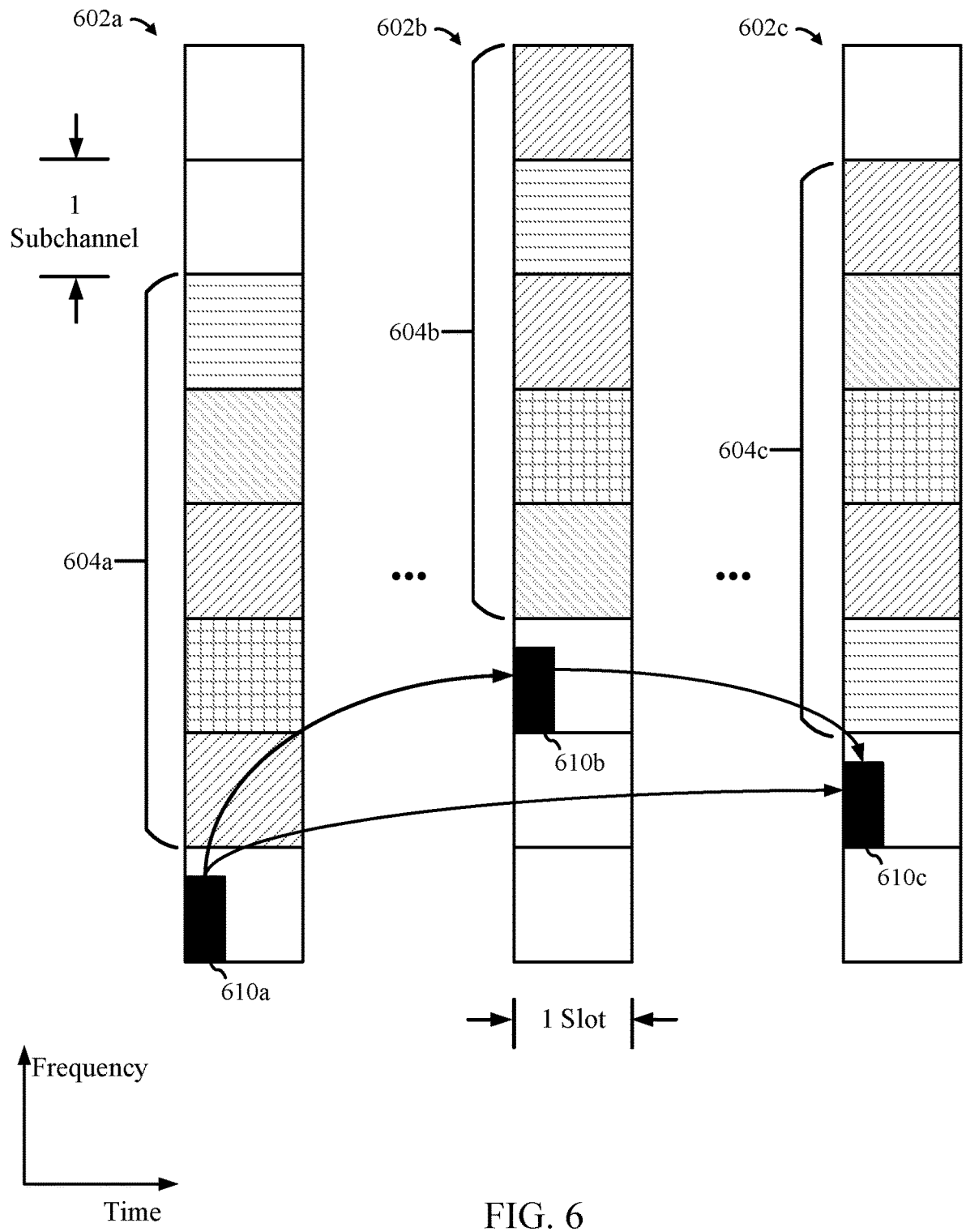
FIG. 6 is a block diagram illustrating transmission of group reservation signals.

FIG. 6 is a block diagram illustrating transmission of group reservation signals 610a, 610b, 610c (collectively referred to as group reservation signals 610). It should be noted that although each full square in FIG. 6 is dimensioned as one subchannel during one slot, any other suitable dimensions are contemplated (e.g., one subchannel during a partial slot, one channel during a slot, etc.). The shaded regions of the squares illustrated in FIG. 6 represent either data or control information (e.g., group reservation signals 610). Accordingly, squares without shading represent unreserved and/or unused resources.

As shown in the example of FIG. 6, a UE (e.g., UE 120a of FIG. 1) may make five separate data transmissions 604 during a first slot 602a (e.g., to five different receivers), wherein each of the data transmissions 604 is made over a single subframe. It should be noted that although each of the data transmissions 604 is illustrated as being over a single subframe, it is contemplated that any one or more of the transmissions may be made over two or more subframes.

The UE 120a may also communicate a group reservation signal 610a (e.g., a PSCCH corresponding to all five of the data transmissions 604) in a first subchannel (e.g., a subchannel occurring at a lower frequency than the subchannels carrying data). Here, the group reservation signal 610a may include the same information as an SCI-1, including: (i) priority of one or more of the data instances of the data transmissions 604, (ii) resource allocation of the data instances, and/or (iii) resource reservation information such as periodicity of the data signal, and/or future resources being reserved for a data signal. For example, group reservation signal 610a may indicate to a receiver future resources reserved for another group reservation signal (e.g., a second group reservation signal 610b or a third group reservation signal 610c) or data signal. Thus, the group reservation signal 610a may provide resource allocation for all five of the data transmissions 604 in the first slot 602a.

Similarly, the UE 120a may communicate additional group reservation signals 610b and 610c in other subchannels, where each subchannel carrying the group reservation signals 610b and 610c occurs a lower frequency than the subchannels carrying data. As above, the group reservation signals 610b and 610c may include the same information as an SCI-1, including: (i) priority of one or more of the data instances of data transmissions in the same slot, (ii) resource allocation of the data instances, and/or (iii) resource reservation information such as periodicity of the data signal, and/or future resources being reserved for a data signal.

In one example, a single UE 120a may transmit the data transmissions 604 and group reservation signals 610 contained in the slots 602 illustrated in FIG. 6. Prior to transmission, the UE 120a may initially determine a resource allocation for transmitting the data and group reservation signals. For example, the UE 120a may determine a time (e.g., a slot or partial slot) and a subchannel for transmitting the group reservation signal and data during the determined time. As shown, the UE 120a may determine a plurality of subchannels to use for the transmission within a slot for transmitting the control information and data, wherein a first subchannel in the plurality of subchannels is allocated for transmitting a group reservation signal, and wherein a first set of subchannels of the plurality of subchannels are allocated for transmitting data to multiple UEs.

For example, the UE 120a may determine to use one or more subchannels for each transmission to the multiple UEs. As illustrated, each of the five data transmissions 604a and group reservation signal 610a require only a single subchannel. As noted, the group reservation signal may include communication parameters indicative of at least the resource allocation for the first set of subchannels for data transmissions 604a. In some examples, the communication parameters include a priority corresponding to the data transmitted on each of the subchannels of the first set of subchannels, and/or an indication of a future resource allocation for transmission of a second group reservation signal and data in a second set of subchannels of the plurality of subchannels. For example, a first group reservation signal 610a may provide an indication of resource allocation of a second group reservation signal 610b and/or a third group reservation signal 610c.

Once the UE 120a has determined the resource allocation for transmitting the data and group reservation signals, the UE 120a may proceed to transmit the group reservation signal over the first subchannel and data to each of the multiple UEs over the corresponding subchannels of the first set of subchannels during the slot. For example, the UE 120a may transmit a first group reservation signal 610a in a first subchannel, and transmit data 604a over the first set of subchannels of the plurality of subchannels in a first slot 602a. The data may be transmitted over a PSSCH portion of the corresponding subchannels of the first set of subchannels, and the group reservation signal may be transmitted over a PSCCH portion of the first subchannel.

In this example, the UE 120a may transmit one or more of the group reservation signals 610 over a portion of the first subchannel, wherein the portion of the first subchannel comprises less than all frequency resources of the first subchannel, and/or a portion of the slot, wherein the portion of the slot comprises less than all time resources of the slot. Using the first group reservation signal 610a as an example, the first group reservation signal 610a may not require all of the time and frequency resources of the first subchannel in the first slot. Thus, in this example, nothing is transmitted in the remaining frequency and time regions of the subchannel that carries the group reservation signals 610. In some examples, the plurality of subchannels within the slot are a set of contiguous subchannels spanning a range of frequency resources. For example, as illustrated, each subchannel that is used for transmitting data or group reservation signaling are contiguously ordered, with no significant gaps between the subchannels. In some examples, the first subchannel occupies a lowest set of frequency resources within the range of frequency resources. Here, the first subchannel (e.g., the subchannel carrying the group reservation signal for each slot) occurs prior to the following subchannels that carry data.

Example Subframe Transmission Carrying Both Data and Group Resource Reservation

It may be beneficial for the UE 120a to utilize the remaining resources of the first subchannel that are not used for transmitting the group reservation signal. In one example, the UE 120a may transmit data (e.g., PSSCH) over any unused portion of the first subchannel that is not used for transmitting the group resource reservation signal (e.g., PSCCH).

Figure 7:
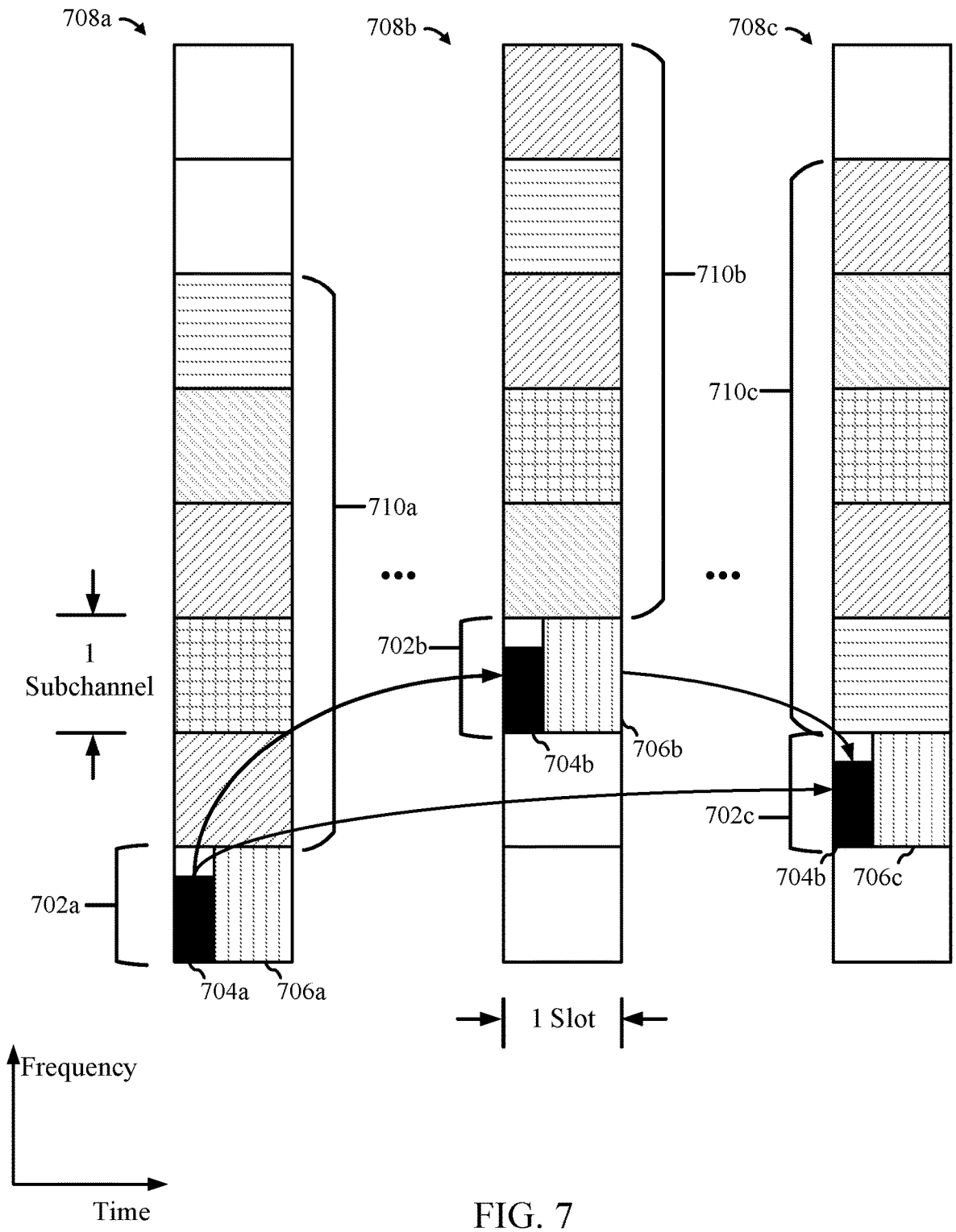
FIG. 7 is a block diagram illustrating transmission of group reservation signals and data signals over the same subframe in the same slot.

FIG. 7 is a block diagram illustrating transmission of group reservation signals 704a, 704b, 704c (collectively referred to as group reservation signals 704) and data signals 706a, 706b, 706c (collectively referred to as data signals 706) over the same subframe in the same slot. It should be noted that although each full square in FIG. 7 is dimensioned as one subchannel during one slot, any other suitable dimensions are contemplated (e.g., one subchannel during a partial slot, one channel during a slot, etc.). The shaded regions of the squares illustrated in FIG. 7 represent either data 706 or control information (e.g., group reservation signals 704). Accordingly, squares or regions of squares without shading represent unreserved and/or unused resources.

In this example, a first resource 702a occurs in a first subchannel during a first slot 708a. The first resource 702a includes a time dimension (e.g., slot) and a frequency dimension (e.g., subchannel). Similarly, a second slot includes a second resource 702b, and a third slot 708c includes a third resource 702c (each of the first, second, and third resources collectively referred to as the "resources 702"). Each of the resources includes a corresponding first reservation signal 704a, a second reservation signal 704b, and a third reservation signal 704c, as well as a corresponding first data signal 706a, second data signal 706b, and third data signal 706c. Each slot may also include resources for only data transmission. For example, the first slot 708a may include a first set of data resources 710a, the second slot 708b may include a second set of data resources 710b, and the third slot 708c may include a third set of data resources 710c (collectively referred to as a set of resources 710).

The UE 120a may be configured to transmit both a group reservation signal 704 and a data signal 706 in the same resource 702. For example, the UE 120a may transmit the group reservation signal over a first portion of the resource 702, wherein the first portion of the resource comprises less than all the time resources of the resource. As illustrated, the group reservation signal 704 occupies a time dimension of the resource 702 that is first in time (e.g., prior in time to the portion of the resource 702 that the data signal 706 occupies). In some examples, the UE 120a may transmit a data signal 706 over a second portion of the resource 702, wherein the second portion of the resource includes time resources of the resource 702 separate from the first portion of the resource. As noted, the first portion of the resource 702 may be prior in time to the second portion of the resource 702.

Thus, the UE 120a may be configured to determine resource allocation for multiple transmissions, where the resource allocation includes an allocation of resources for both a group reservation signal 704 and a data signal in a single resource 702. For example, the UE 120a may determine a resource allocation for transmitting group reservation signal 704 and a data signal over a first subchannel of a slot (e.g., resource 702). In this example, the UE 120a may generate the group reservation signal 704 so that it indicates a reservation of resources for the UE's 120a transmission of: (i) a group reservation signal 704, (ii) a data signal 706 in the same resource as the group reservation signal 704, and (iii) data signals in the set of resources 710. For example, the UE 120a may generate the first group reservation signal 704a to indicate, to other UEs receiving the first group reservation signal 704a, a reservation of resources used for transmitting the first data signal 706a, and each data signal in the first set of data signals 710a. It should be noted that the first group reservation signal 704a may include additional resource reservation information, including: resource allocation for future group reservation signals, periodicity of future group reservation signals and/or data signals, etc.

Alternatively, the group reservation signal 704 may only provide a resource reservation for a data signal 706 in the same slot and subchannel as the group reservation signal 704. For example, the UE 120a may determine resource allocation for: the first group reservation signal 704a, the first data signal 706a, and each data signal in the first set of data signals 710a. The UE 120a may then generate the first group reservation signal 704a, wherein the first group reservation signal 704a provides an indication of the resources reserved for the first data signal 706a (and optionally future data signals such as the second data signal 706b and/or the third data signal 706c), but does not include an indication of the resources reserved for any of the other data signals in the first set of data signals 710a.

In some examples, group reservation signal 704 may have not have any indication of the data signal 706. Instead, the data signal 706 may be scheduled via semi persistent scheduling (SPS) by, for example, RRC signaling. In some examples, the data signal 706 may be scheduled via cross-carrier scheduling (e.g., a separate carrier is configured to transmit control information such as resource reservations, and another carrier provides the data signaling). In either case, no PSCCH is required to schedule the data signal 706 on the same carrier.

In some examples, the group reservation signal 704 may use fewer frequency resources than the data signal 706.

Accordingly, each resource 702 may include a gap of unused time and frequency (illustrated in FIG. 7 as a region above the group reservation signal 704 and within the resource 702).

Figure 8:
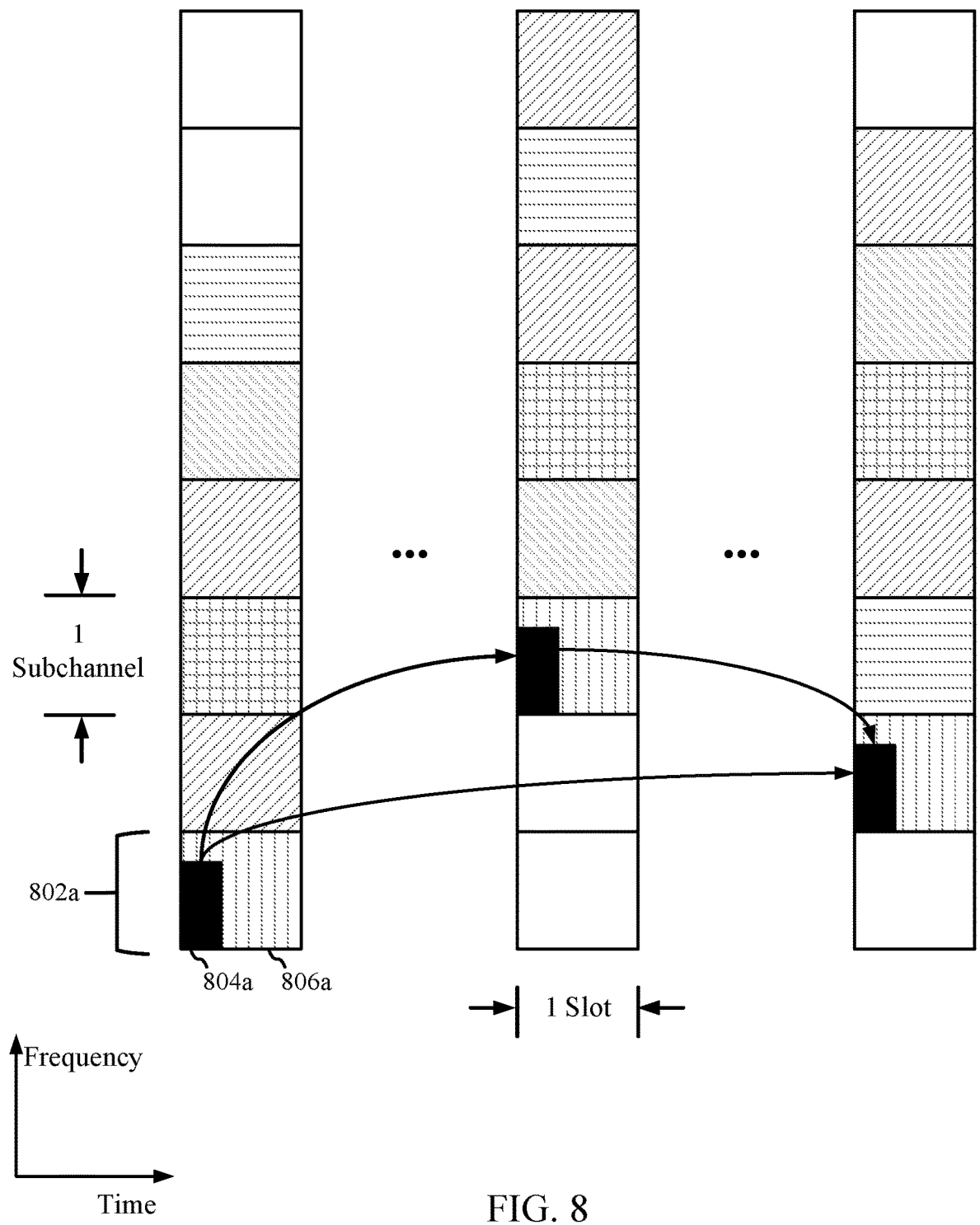
FIG. 8 is a block diagram illustrating transmission of group reservation signals and data signals over the same subframe in the same slot that utilizes the resource gap of the example in FIG. 7.

FIG. 8 is a block diagram illustrating transmission of group reservation signals 804a, 804b, 804c (collectively referred to as group reservation signals 804) and data signals 806a, 806b, 806c (collectively referred to as data signals 806) over the same subframe in the same slot that utilizes the resource gap of the example in FIG. 7. In this example, the data signals 806 are rate matched around the group reservation signals 804, reducing or eliminating gaps between the PSSCH and PSCCH. Accordingly, the group reservation signal 804 may include an indication of the resources reserved for the data signals 806 and/or any additional data transmissions in the same slot.

Figure 9:
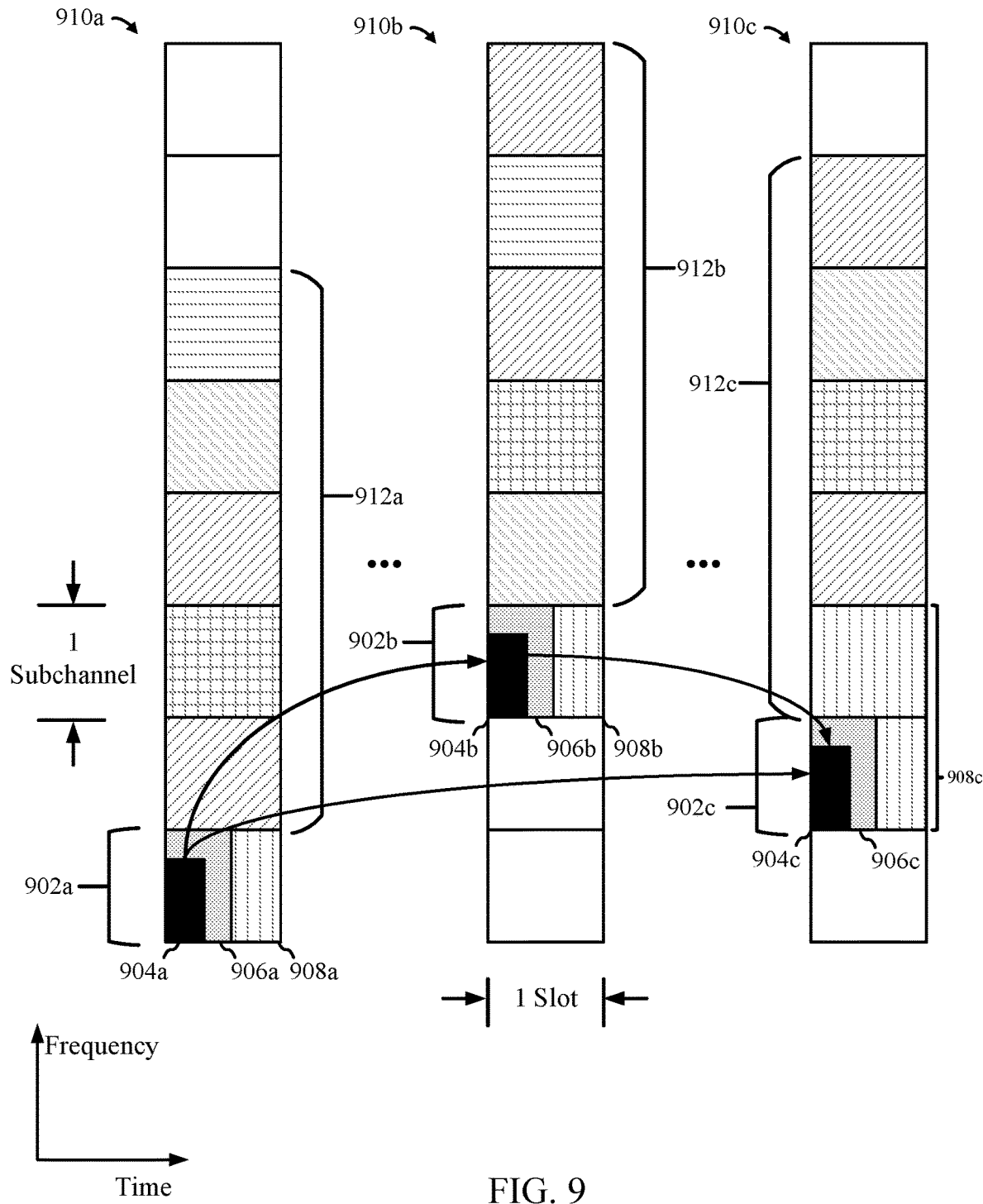
FIG. 9 is a block diagram illustrating transmission of group reservation signals, control signals, and data signals over the same subframe in the same slot.

FIG. 9 is a block diagram illustrating transmission of group reservation signals 904a, 904b, 904c (collectively referred to as group reservation signal(s) 904), control signals 906a, 906b, 906c (collectively referred to as control signal(s) 906), and data signals 908a, 908b, 908c (collectively referred to as data signal(s) 908) over the same subframe in the same slot 910a, 910b, 910c (collectively referred to as slot(s) 910). Each slot 910 includes a corresponding set of resources 912a, 912b, 912c (collectively referred to as a set of resource 910) that the UE 120a has allocated for transmission of separate data signals.

It should be noted that although each full square in FIG. 9 is dimensioned as one subchannel during one slot, any other suitable dimensions are contemplated (e.g., one subchannel during a partial slot, one channel during a slot, etc.). The shaded regions of the squares illustrated in FIG. 9 represent either data (e.g., data signal 908 or data signals transmitted over the set of resources 910) or control information (e.g., group reservation signals 904 and control signals 906). Accordingly, squares or regions of squares without shading represent unreserved and/or unused resources.

As shown in FIG. 9, the UE 120a may generate and transmit a group reservation signal 904 and a control signal 906 in the same slot (e.g., in a first resource 902a, a second resource 902b, and a third resource 902c). In some examples, the group reservation signal 904 may include the same information provided in an SCI-1 message, and the control signal 906 may include the same information as an SCI format 2 (SCI-2) message. That is, the group reservation signal 904 may include a bit-field (e.g., 2-bit) configured to provide a location of the control signal 906 so that a receiving UE can decode the control signal 906. In some examples, the control signal 906 includes a frequency domain resource allocation (FDRA) that provides the receiving UE with information required for it to decode a corresponding data signal 908. For example, the control signal 906 may provide information allowing the receiving UE to decode the data signal 908 of the same slot 910 as the control signal 906, or the data signal 908 of a future slot 910.

In some examples, the control signal 906 is rate matched to the first X subchannels (e.g., the one or more subchannels having the lowest frequency of a contiguous series of subchannels used by the UE 120a to transmit data) of a slot 910. For example, if X=1, then the control signal 906 is rate matched to a single subchannel in the slot, the single subchannel being the lowest frequency subchannel. If X≥2, then the control signal 906 is rate matched to two or more subchannels, where the two or more subchannels are in a contiguous series that begins at the lowest frequency of a transmission over the slot. That is, if X≥1, then the data signal 908, and optionally the control signal 906, can span X subchannels. For example, the third slot 910c shows an example of a data signal 908c that spans X=2 subchannels.

Figure 10:
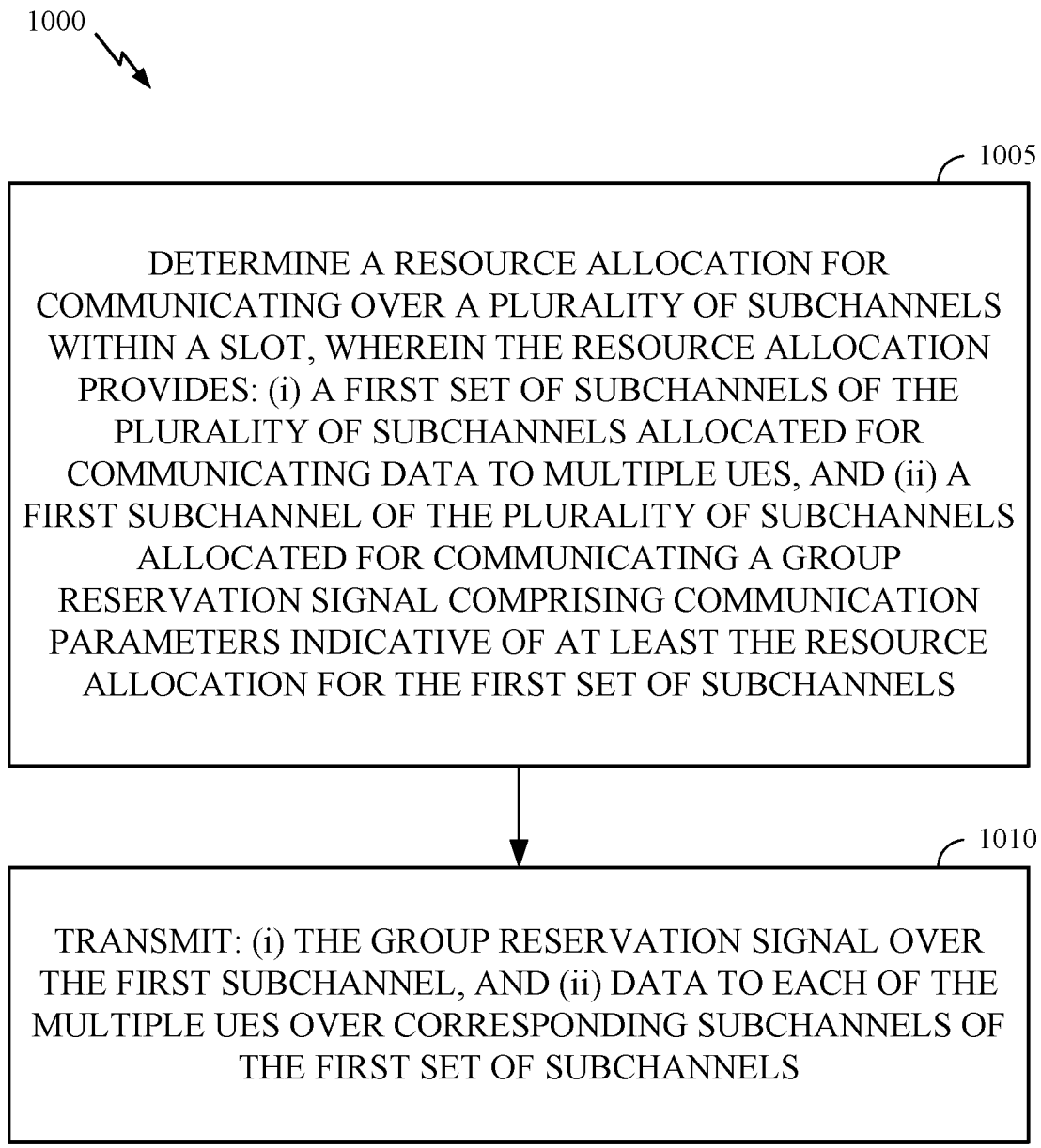
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., such as a UE 120a in the wireless communication network 100). Operations 1000 may be implemented as software components that are executed and run on one or more processors (e.g., controller/processor 280 of FIG. 2). Further, the transmission and reception of signals by the UE 120a in operations 1000 may be enabled, for example, by one or more antennas (e.g., antennas 252 of FIG. 2). In certain aspects, the transmission and/or reception of signals by the UE 120a may be implemented via a bus interface of one or more processors (e.g., controller/processor 280) obtaining and/or outputting signals.

The operations 1000 may begin, at block 1005, by determining a resource allocation for communicating over a plurality of subchannels within a slot, wherein the resource allocation provides: (i) a first set of subchannels of the plurality of subchannels allocated for communicating data to multiple UEs, and (ii) a first subchannel of the plurality of subchannels allocated for communicating a group reservation signal comprising communication parameters indicative of at least the resource allocation for the first set of subchannels.

The operations 1000 may include, at block 1010, transmitting: (i) the group reservation signal over the first subchannel, and (ii) data to each of the multiple UEs over corresponding subchannels of the first set of subchannels.

In some examples, the transmission comprises transmitting the group reservation signal over at least one of: a portion of the first subchannel, wherein the portion of the first subchannel comprises less than all frequency resources of the first subchannel, or a portion of the slot, wherein the portion of the slot comprises less than all time resources of the slot.

In some examples, the communication parameters further comprise at least one of: a priority corresponding to the data transmitted on each of the subchannels of the first set of subchannels, or an indication of a future resource allocation for transmission of a second group reservation signal and data in a second set of subchannels of the plurality of subchannels.

In some examples, the transmission comprises: transmitting the data over a physical sidelink shared channel (PSSCH) portion of the corresponding subchannels of the first set of subchannels, and transmitting the group reservation signal over a physical sidelink control channel (PSCCH) portion of the first subchannel.

In some examples, the plurality of subchannels are contiguous subchannels spanning a range of frequency resources.

In some examples, the first subchannel occupies a lowest set of frequency resources within the range of frequency resources.

In some examples, the transmission comprises transmitting the group reservation signal over a first portion of the slot within the first subchannel, wherein the first portion of the slot comprises less than all the time resources of the slot, and transmitting at least part of the data in a second portion of the slot within the first subchannel, wherein the second portion of the slot comprises time resources of the slot separate from the first portion of the slot, and wherein the first portion of the slot is prior in time to the second portion of the slot.

In some examples, the operations 1000 further comprise determining a second resource allocation for communicating an individual reservation signal and additional data over the first subchannel of the slot, the additional data corresponding to the individual reservation signal, the individual reservation signal comprising communication parameters indicative of a resource allocation for the transmission of the individual reservation signal and the additional data, and transmitting the individual reservation signal and the additional data in a first portion of the slot within the first subchannel, wherein: (i) the transmission of the group reservation signal comprises transmitting the group reservation signal over a second portion of the slot within the first subchannel, (ii) the second portion of the slot comprises less than all the time resources of the slot, (iii) the second portion of the slot comprises time resources of the slot separate from the first portion of the slot, and (iv) the second portion of the slot is prior in time to the first portion of the slot.

In some examples, the individual reservation signal comprises a first sidelink control signal and a second sidelink control signal, the first sidelink control signal comprises an indication of a location of the second sidelink control signal, and the second sidelink control signal comprises an indication of a frequency domain resource allocated for the additional data.

Figure 11:
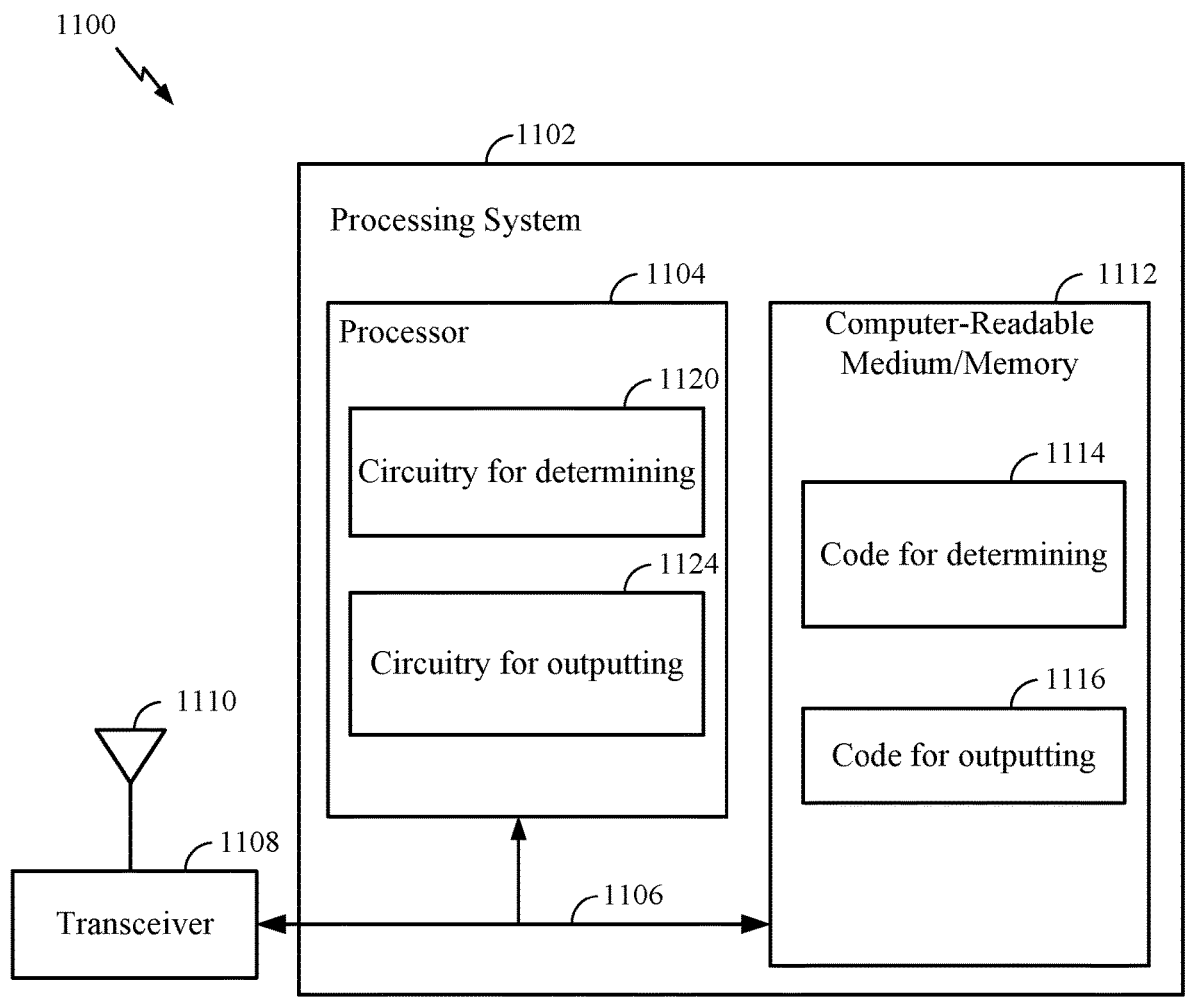
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 10. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 10, or other operations for performing the various techniques discussed herein. In certain aspects, computer-readable medium/memory 1112 stores code 1114 for determining a resource allocation for communicating over a plurality of subchannels within a slot, wherein the resource allocation provides: a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels. The computer-readable medium/memory 1112 may also store code 1116 for outputting, for transmission: the group reservation signal over the first subchannel, and data to each of the multiple UEs over corresponding subchannels of the first set of subchannels.

In certain aspects, the processor 1104 has circuitry configured to implement the code stored in the computer-readable medium/memory 1112. The processor 1104 includes circuitry 1120 for determining a resource allocation for communicating over a plurality of subchannels within a slot, wherein the resource allocation provides: a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels. The processor 1104 may also store circuitry 1124 for outputting, for transmission: the group reservation signal over the first subchannel, and data to each of the multiple UEs over corresponding subchannels of the first set of subchannels.

EXAMPLE ASPECTS

Aspect 1: A method of wireless communications by a user equipment (UE), comprising: determining a resource allocation for communicating over a plurality of subchannels within a slot, wherein the resource allocation provides a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels; and transmitting the group reservation signal over the first subchannel, and data to each of the multiple UEs over corresponding subchannels of the first set of subchannels.

Aspect 2: The method of Aspect 1, wherein the transmission of the group reservation message comprises transmitting the group reservation signal over at least one of: a portion of the first subchannel, wherein the portion of the first subchannel comprises less than all frequency resources of the first subchannel, or a portion of the slot, wherein the portion of the slot comprises less than all time resources of the slot.

Aspect 3: The method of any one of Aspects 1-2, wherein the communication parameters further comprise at least one of: a priority corresponding to the data transmitted on each of the subchannels of the first set of subchannels, or an indication of a future resource allocation for transmission of a second group reservation signal and data in a second set of subchannels of the plurality of subchannels.

Aspect 4: The method of any one of Aspects 1-3, wherein: the transmission of the data comprises transmitting the data over a physical sidelink shared channel (PSSCH) portion of the corresponding subchannels of the first set of subchannels; and the transmission of the group reservation signal comprises transmitting the group reservation signal over a physical sidelink control channel (PSCCH) portion of the first subchannel.

Aspect 5: The method of any one of Aspects 1-4, wherein the plurality of subchannels are contiguous subchannels spanning a range of frequency resources.

Aspect 6: The method of Aspect 5, wherein the first subchannel occupies a lowest set of frequency resources within the range of frequency resources.

Aspect 7: The method of any one of Aspects 1-6, wherein: the transmission of the group reservation signal comprises transmitting the group reservation signal over a first portion of the slot within the first subchannel, wherein the first portion of the slot comprises less than all time resources of the slot; and the transmission of the data comprises transmitting at least part of the data in a second portion of the slot within the first subchannel, wherein the second portion of the slot comprises time resources of the slot separate from the first portion of the slot, and wherein the first portion of the slot is prior in time to the second portion of the slot.

Aspect 8: The method of any one of Aspects 1-7, further comprising: determining a second resource allocation for communicating an individual reservation signal and additional data over the first subchannel of the slot, the additional data corresponding to the individual reservation signal, the individual reservation signal comprising communication parameters indicative of a resource allocation for transmission of the individual reservation signal and the additional data; and transmitting the individual reservation signal and the additional data in a first portion of the slot within the first subchannel, wherein the transmission of the group reservation signal comprises transmitting the group reservation signal over a second portion of the slot within the first subchannel, the second portion of the slot comprises less than all time resources of the slot, the second portion of the slot comprises time resources of the slot separate from the first portion of the slot, and the second portion of the slot is prior in time to the first portion of the slot.

Aspect 9: The method of Aspect 8, wherein: the individual reservation signal comprises a first sidelink control signal and a second sidelink control signal, the first sidelink control signal comprises an indication of a location of the second sidelink control signal, and the second sidelink control signal comprises an indication of a frequency domain resource allocated for the additional data.

Aspect 10: A user equipment, comprising means for performing the operations of one or more of Aspects 1-9.

Aspect 11: A user equipment, comprising a transceiver and a processing system including at least one processor configured to perform the operations of one or more of Aspects 1-9.

Aspect 12: An apparatus for wireless communications by a user equipment (UE), comprising: a processing system configured to determine a resource allocation for communicating over a plurality of subchannels within a slot, wherein the resource allocation provides: a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels; and an interface configured to output, for transmission, the group reservation signal over the first subchannel, and data to each of the multiple UEs over corresponding subchannels of the first set of subchannels.

Aspect 13: A computer-readable medium for wireless communications, comprising codes executable by an apparatus to: determine a resource allocation for communicating over a plurality of subchannels within a slot, wherein the resource allocation provides a first set of subchannels of the plurality of subchannels allocated for communicating data to multiple UEs, and a first subchannel of the plurality of subchannels allocated for communicating a group reservation signal comprising communication parameters indicative of at least the resource allocation for the first set of subchannels; and output, for transmission, the group reservation signal over the first subchannel, and data to each of the multiple UEs over corresponding subchannels of the first set of subchannels.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 1000 of FIG. 10.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for determining may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE), comprising:
   determining a resource allocation for communicating over a plurality of subchannels within a slot, wherein the resource allocation provides:
      a first set of subchannels of the plurality of subchannels allocated for communicating data to multiple UEs, and
      a first subchannel of the plurality of subchannels allocated for communicating a group reservation signal corresponding to the first set of subchannels, wherein the group reservation signal comprises communication parameters indicative of at least the resource allocation for the first set of subchannels for communicating the data by the UE to the multiple UEs; and
   transmitting:
      the group reservation signal over the first subchannel, and
      data to each of the multiple UEs over corresponding subchannels of the first set of subchannels.

2. The method of claim 1, wherein the transmission of the group reservation signal comprises transmitting the group reservation signal over at least one of:
   a portion of the first subchannel, wherein the portion of the first subchannel comprises less than all frequency resources of the first subchannel, or
   a portion of the slot, wherein the portion of the slot comprises less than all time resources of the slot.

3. The method of claim 1, wherein the communication parameters further comprise at least one of:
   a priority corresponding to the data transmitted on each of the subchannels of the first set of subchannels, or
   an indication of a future resource allocation for transmission of a second group reservation signal and data in a second set of subchannels of the plurality of subchannels.

4. The method of claim 1, wherein:
   the transmission of the data comprises transmitting the data over a physical sidelink shared channel (PSSCH) portion of the corresponding subchannels of the first set of subchannels; and
   the transmission of the group reservation signal comprises transmitting the group reservation signal over a physical sidelink control channel (PSCCH) portion of the first subchannel.

5. The method of claim 1, wherein the plurality of subchannels are contiguous subchannels spanning a range of frequency resources.

6. The method of claim 5, wherein the first subchannel occupies a lowest set of frequency resources within the range of frequency resources.

7. The method of claim 1, wherein:
   the transmission of the group reservation signal comprises transmitting the group reservation signal over a first portion of the slot within the first subchannel, wherein the first portion of the slot comprises less than all time resources of the slot; and
   the transmission of the data comprises transmitting at least part of the data in a second portion of the slot within the first subchannel, wherein the second portion of the slot comprises time resources of the slot separate from the first portion of the slot, and wherein the first portion of the slot is prior in time to the second portion of the slot.

8. The method of claim 1, further comprising:
   determining a second resource allocation for communicating an individual reservation signal and additional data over the first subchannel of the slot, the additional data corresponding to the individual reservation signal, the individual reservation signal comprising communication parameters indicative of a resource allocation for transmission of the individual reservation signal and the additional data; and
   transmitting the individual reservation signal and the additional data in a first portion of the slot within the first subchannel, wherein:
      the transmission of the group reservation signal comprises transmitting the group reservation signal over a second portion of the slot within the first subchannel,
      the second portion of the slot comprises less than all time resources of the slot,
      the second portion of the slot comprises time resources of the slot separate from the first portion of the slot, and
      the second portion of the slot is prior in time to the first portion of the slot.

9. The method of claim 8, wherein:
   the individual reservation signal comprises a first sidelink control signal and a second sidelink control signal,
   the first sidelink control signal comprises an indication of a location of the second sidelink control signal, and
   the second sidelink control signal comprises an indication of a frequency domain resource allocated for the additional data.

10. A user equipment (UE), comprising:
    a processing system configured to determine a resource allocation for communicating over a plurality of subchannels within a slot, wherein the resource allocation provides:
       a first set of subchannels of the plurality of subchannels allocated for communicating data to multiple UEs, and
       a first subchannel of the plurality of subchannels allocated for communicating a group reservation signal corresponding to the first set of subchannels, wherein the group reservation signal comprises communication parameters indicative of at least the resource allocation for the first set of subchannels for communicating the data by the UE to the multiple UEs; and a transmitter configured to transmit:
the group reservation signal over the first subchannel, and
data to each of the multiple UEs over corresponding subchannels of the first set of subchannels.

11. The UE of claim 10, wherein the transmitter is configured to transmit the group reservation signal over at least one of:
a portion of the first subchannel, wherein the portion of the first subchannel comprises less than all frequency resources of the first subchannel, or
a portion of the slot, wherein the portion of the slot comprises less than all time resources of the slot.

12. The UE of claim 10, wherein the communication parameters further comprise at least one of:
a priority corresponding to the data transmitted on each of the subchannels of the first set of sub channels, or
an indication of a future resource allocation for transmission of a second group reservation signal and data in a second set of subchannels of the plurality of subchannels.

13. The UE of claim 10, wherein:
the transmitter is configured to transmit the data over a physical sidelink shared channel (PSSCH) portion of the corresponding subchannels of the first set of subchannels; and
the transmitter is configured to transmit the group reservation signal over a physical sidelink control channel (PSCCH) portion of the first subchannel.

14. The UE of claim 10, wherein the plurality of subchannels are contiguous subchannels spanning a range of frequency resources.

15. The UE of claim 14, wherein the first subchannel occupies a lowest set of frequency resources within the range of frequency resources.

16. The UE of claim 10, wherein:
the transmitter is configured to transmit the group reservation signal over a first portion of the slot within the first subchannel, wherein the first portion of the slot comprises less than all time resources of the slot; and
the transmitter is configured to transmit at least part of the data in a second portion of the slot within the first subchannel, wherein the second portion of the slot comprises time resources of the slot separate from the first portion of the slot, and wherein the first portion of the slot is prior in time to the second portion of the slot.

17. The UE of claim 10, wherein:
the processing system is further configured to determine a second resource allocation for communicating an individual reservation signal and additional data over the first subchannel of the slot, the additional data corresponding to the individual reservation signal, the individual reservation signal comprising communication parameters indicative of a resource allocation for transmission of the individual reservation signal and the additional data; and
the transmitter is further configured to transmit the individual reservation signal and the additional data in a first portion of the slot within the first subchannel, wherein:

the transmitter is configured to transmit the group reservation signal over a second portion of the slot within the first subchannel,
the second portion of the slot comprises less than all time resources of the slot,
the second portion of the slot comprises time resources of the slot separate from the first portion of the slot, and
the second portion of the slot is prior in time to the first portion of the slot.

18. The UE of claim 17, wherein:
the individual reservation signal comprises a first sidelink control signal and a second sidelink control signal,
the first sidelink control signal comprises an indication of a location of the second sidelink control signal, and
the second sidelink control signal comprises an indication of a frequency domain resource allocated for the additional data.

19. A user equipment (UE) for wireless communications, comprising:
a memory comprising processor-executable instructions; and
one or more processors configured to execute the processor-executable instructions and cause the UE to:
determine a resource allocation for communicating over a plurality of subchannels within a slot, wherein the resource allocation provides:
a first set of subchannels of the plurality of subchannels allocated for communicating data to multiple UEs, and
a first subchannel of the plurality of subchannels allocated for communicating a group reservation signal corresponding to the first set of subchannels, wherein the group reservation signal comprises communication parameters indicative of at least the resource allocation for the first set of subchannels for communicating the data by the UE to the multiple UEs; and
output, for transmission:
the group reservation signal over the first subchannel, and
data to each of the multiple UEs over corresponding subchannels of the first set of subchannels.

20. A non-transitory computer-readable medium for wireless communications, comprising codes executable to:
determine a resource allocation for communicating over a plurality of subchannels within a slot, wherein the resource allocation provides:
a first set of subchannels of the plurality of subchannels allocated for communicating data to multiple UEs, and
a first subchannel of the plurality of subchannels allocated for communicating a group reservation signal corresponding to the first set of subchannels, wherein the group reservation signal comprises communication parameters indicative of at least the resource allocation for the first set of subchannels for communicating the data by the UE to the multiple UEs; and
output, for transmission:
the group reservation signal over the first subchannel, and
data to each of the multiple UEs over corresponding subchannels of the first set of subchannels.

* * * * *